Jan. 25, 1927.  R. T. HOSKING  1,615,382
WASHER
Filed Feb. 14, 1925
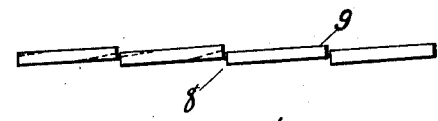
FIG. 4
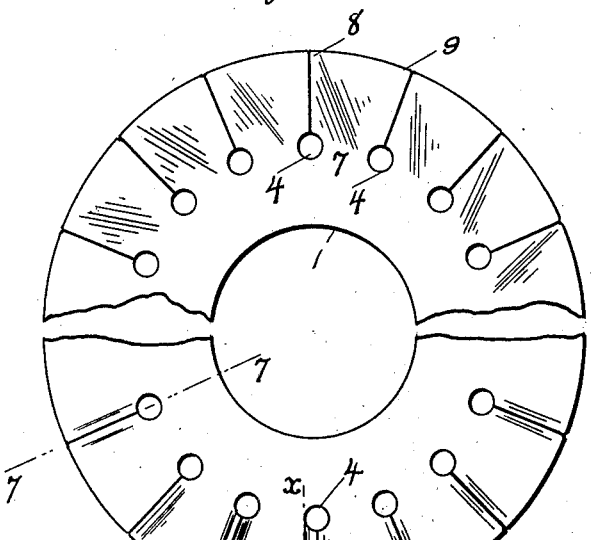
FIG. 3
FIG. 1
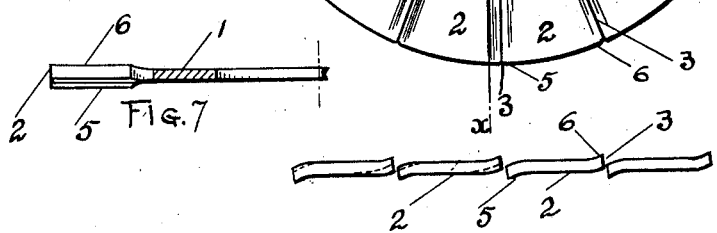
FIG. 2
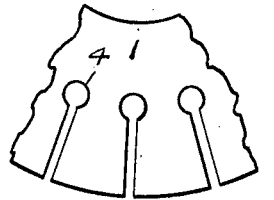
FIG. 6
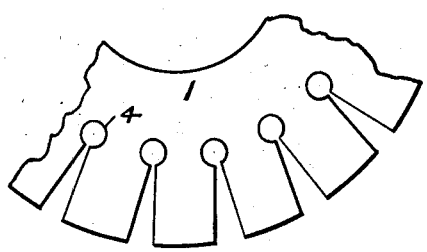
FIG. 5
INVENTOR
Richard T. Hosking
BY
George B. Willcox.
ATTORNEY Patented Jan. 25, 1927.

1,615,382

UNITED STATES PATENT OFFICE.

RICHARD T. HOSKING, OF WILMETTE, ILLINOIS, ASSIGNOR, BY MESNE ASSIGNMENTS, TO SHAKEPROOF LOCK WASHER COMPANY, INCORPORATED, DIVISION OF ILLINOIS TOOL WORKS, OF CHICAGO, ILLINOIS, A CORPORATION OF ILLINOIS.

WASHER.

Application filed February 14, 1925. Serial No. 9,145. REISSUED

This invention relates to lock washers for nuts and bolts, the washers being of the type in which the base of the nut or the head of the bolt is locked to the sub-structure by the biting action of the washer teeth.

More especially the washers to which my improvement is applied are the kind described in Patent No. 261,947 to F. Murphy, issued Aug. 1, 1882 and No. 302,860, July 29, 1888. Washers of the kind referred to were made by punching the center out of a piece of spring steel to form a bolt passage, and forming a series of leaves by cutting radial kerfs or slits extending from the inner or outer periphery, as the case may be, part way across the annular ring or body of the washer. The leaves were then twisted out of the plane of the washer to form angular prongs that act as plane bits to plane out their own depth from the surface of the nut or from the sub-structure when the nuts are unscrewed.

Such washers were found in practice to have two disadvantages, namely, the cutting of the radial slits and the twisting of the leaves weakened the washer body, causing it to crack at the end of the slit when subjected to the severe twisting strains of tightening or loosening the nut or bolt. The other disadvantage arose from the fact that the desired biting action was limited to the extreme corner of the twisted leaf because twisting the free end of the leaf out of the plane of the washer gives the extreme end of the teeth the greatest amount of offset.

In my invention I employ the Murphy type of washer, but overcome the above mentioned difficulties, which are inherent in that and similar washer constructions. I prevent cracking the body of the washer by providing a hole of any suitable shape through the washer body at the end of the usual kerf or slit. I further employ this hole as a means for increasing the length of the effective biting edge, keeping it rectilinear, or unwarped and thereby correspondingly increasing the gripping power of the washer to resist unscrewing the nut.

My improvement with respect to increasing the length of the biting edge may be brought about in either of two ways, both of which will be described and claimed herein.

With the foregoing and certain other objects in view which will appear later in the specifications, my invention comprises the devices described and claimed and the equivalents thereof.

Fig. 1 is a plan view of part of a washer embodying my improvement.

Fig. 2 is a developed view of the edge of the part shown in Fig. 1.

Fig. 3 is a plan view of part of a washer showing a modified form of tooth.

Fig. 4 is a developed edge view of the modified teeth shown in Fig. 3.

Figs. 5 and 6 are fragmentary plan views showing modified arrangements of the slits or kerfs.

Fig. 7 is a section on line 7—7 of Fig. 1.

As is clearly shown in the drawings, 1 indicates the body of the washer, which may be flat, or of other suitable shape. 2 are the leaves or teeth formed by slits 3, and 4 are the holes located at the ends of the slits 3 and communicating with them. These holes, as previously stated, prevent splitting or or cracking of the washer body at the ends of the slits. The holes also serve an additional purpose in the functioning of the washer, as will be seen in the preferred form of Figs. 1 and 2, where each leaf 2 has its main part in the plane of the washer body 1, but the sides only are bent by flanging along a line X—X, parallel to the edge of the leaf and into the hole 4. The edges are thereby equally offset their full length from the plane of the body, as shown in Fig. 7, one edge 5 being bent down and the other edge 6 bent up. Bending the edges 5 and 6 so as to offset them equally throughout their entire length without warping the main part of the leaf 2 is made entirely possible in the preferred construction of Fig. 1 and substantially so in the modification, Fig. 3, by the presence of the holes 4, which permit offsetting without warping or twisting the biting edges. In the modified form shown in Figs. 3 and 4 the leaves are twisted at their place of attachment to the washer body 1, and consequently are slightly rotated about their longitudinal axes, but the leaves themselves are not warped, as was done in the structures of the patents previously referred to. By reason of the holes 4, 4, Fig. 3, the only distortion of the metal that is caused by axially rotating, but not warping leaf 2, takes place mostly at the narrowed neck between the two holes, as at 7, Fig. 3. Consequently the edge 8, which may, for example, be offset downwardly, and the edge 9, offset upwardly, are not warped as regards their biting edges. In the Murphy structures the leaves themselves as well as their working edges are warped. Therefore leaves 2, twisted only between the holes 4, 4, present longer and more effective, because straighter, biting edges than are presented by the warped edges of the warped leaves in the earlier structures, without the holes 4.

While I have shown my improvement as applied to a Murphy washer of the type in which the leaves extend radially outward, it is obvious that the improvement may also be employed on washers the teeth of which are on the inner instead of the outer periphery.

In Figs. 2 and 4, I have, by full lines, shown biting edges 5, 6 and 8, 9, of the same thickness as the main part of the leaves. These lateral edges between the slits 3 may, however, be thinner than the leaves, and offset to a biting edge as shown by dotted lines. The thinned edge can not be completely flattened when the nut is clamped tight down upon the washer, and therefore never loses its capacity for biting into the nut as soon as the nut tends to unscrew. A positive lock is, therefore, attained, even before the nut has moved appreciably toward unscrewing.

Having thus described my invention, what I claim and desire to secure by Letters Patent is:

1. A lock washer comprising an annular body having substantially radial slits terminating in holes and forming a plurality of radially disposed leaves, the part of each leaf between two of said holes comprising a narrowed neck, said neck warped by twisting to slightly rotate the leaf about its longitudinal axis, for the purposes set forth.

2. A lock washer comprising an annular body having substantially radial slits terminating in holes and forming a plurality of radially disposed leaves, that part only of the body of a leaf between adjacent holes axially twisted to slightly offset the edges of the leaf with respect to the plane of said washer body, said leaf slightly flanged along lines parallel with its lateral edges, for the purposes set forth.

3. A lock washer comprising an annular body having radial slits terminating in holes and forming a plurality of radially disposed leaves, the part of each leaf between two of said holes comprising a narrowed neck, said neck warped by twisting to slightly rotate the leaf about its longitudinal axis, the part of the leaf beyond said holes unaffected by said twisting at the neck, for the purposes set forth.

4. A lock washer comprising an annular body having radial slits terminating in holes and forming a plurality of radially disposed leaves, the part of each leaf between two of said holes comprising a narrowed neck, slightly twisted, the part of said leaf beyond said holes unaffected by said twisting at the neck, the said leaves formed with lateral edges of less thickness than the body of the washer.

In testimony whereof, I affix my signature.

RICHARD T. HOSKING.